United States Patent Office 3,020,893
Patented Feb. 13, 1962

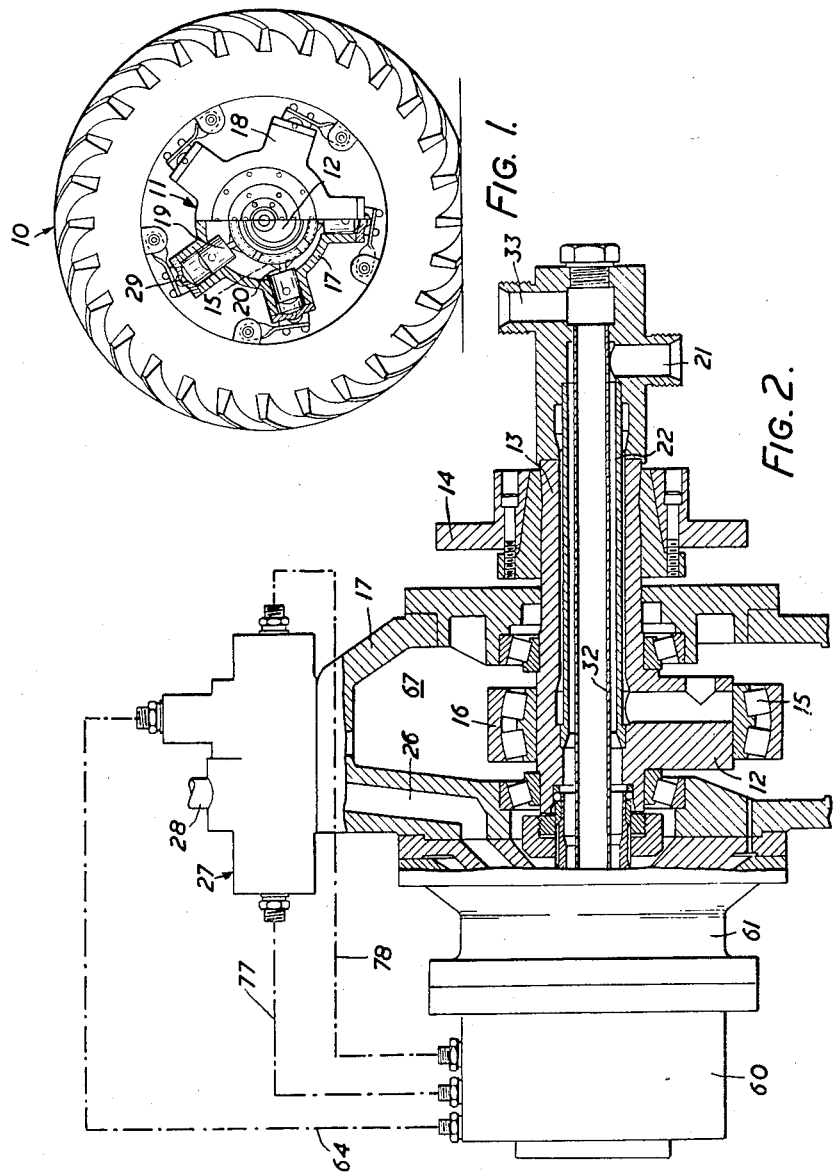

3,020,893
MOTORS FOR HYDROSTATIC POWER
TRANSMISSION SYSTEMS
Henry Joel Hamblin, Putnoe, and Harry James Nation, Silsoe, England, assignors to National Research Development Corporation, London, England, a British corporation
Filed June 23, 1959, Ser. No. 822,228
Claims priority, application Great Britain June 24, 1958
7 Claims. (Cl. 121—59)

This invention relates to motors for hydrostatic power transmission systems of the kind in which a positive displacement variable delivery pump delivers hydraulic fluid under pressure to a positive displacement rotary hydraulic motor. While such systems are quite efficient when the pump is operating at and near to its full delivery capacity, the efficiency falls off considerably as the delivery is reduced. If, therefore, the pump is large enough to provide an adequate delivery for high speed running of the motor, it will be unnecessarily large, and corresponding inefficient, when the motor is running slowly and when loads and pressures may well be high. It is an object of the invention to provide a hydrostatic power transmission system of the kind specified which will have a satisfactory efficiency over a wide range of speeds.

According to the present invention, a positive displacement rotary hydraulic motor for a hydrostatic transmission system has at least five cylinders and is provided with cut-off valve devices such that when one cylinder is under pressure the supply of hydraulic motive fluid to at least one succeeding cylinder is cut off until the stroke of the piston of this succeeding cylinder is wholly or nearly completed.

In this way, the capacity of the hydraulic motor is reduced for high speed low-load operation, and the pump is required to operate over a lower range of deliveries than would otherwise be necessary.

Each cut-off valve device can be actuated either by the pressure in the preceding motor cylinder, or in dependence on the rotational position of the hydraulic motor relative to a non-rotating part.

The arrangement must of course be such that the piston of the cylinder which is under pressure shall not have completed its stroke before the next effective cylinder comes under pressure, so that there will be no position in which the motor exerts no driving torque. Thus, in the case of a five cylinder motor, only alternate cylinders should be cut out, whereas with a motor having, say, seven cylinders, every second and third cylinder can be cut out if desired, for very high speed operation.

Preferably, the total number of cylinders is not an integral multiple of $1+n$, where $n$ is the number of cylinders which can be cut out between two operative cylinders. Unless this is the case, the same cylinders will be cut out on each revolution and uneven wear may result.

The invention may be performed in various ways, and one specific embodiment, and a modification, will now be described by way of example with reference to the accompanying drawings in which FIGURE 1 is a simplified side view, partly in section, of a tractor driving wheel fitted with a five cylinder rotary hydraulic motor embodying the invention;

FIGURE 2 is a fragmentary longitudinal partial section of the hub of the wheel;

Figure 3:
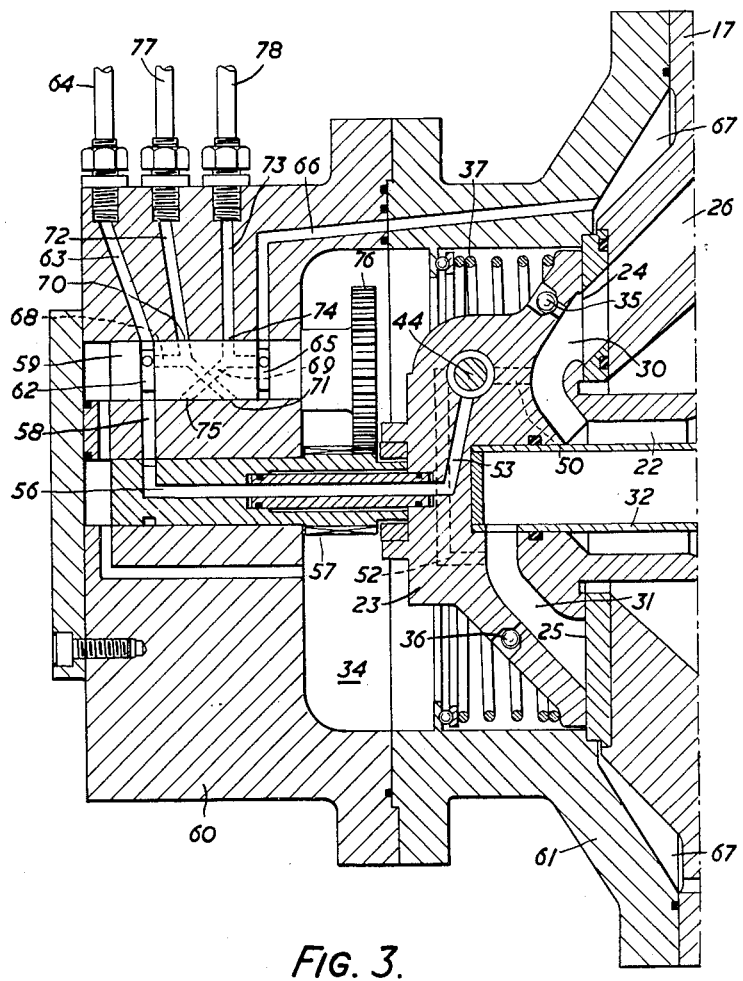
FIGURE 3 is a longitudinal section of a detail of the hub on a larger scale.

Referring to the embodiment shown in FIGURES 1 to 5 of the accompanying drawings, there is built into the driving wheel 10 of an agricultural tractor a five cylinder hydraulic motor 11. This motor is for the most part of known construction and need not be described in detail. Briefly, it comprises an eccentric disc 12 which forms an integral part of a stub shaft 13 fixed in a non-rotatable manner to a frame portion 14 of the tractor. Fixed to the eccentric disc 12 is a roller bearing 15 the outer race 16 of which is rotatable around the fixed eccentric disc 12.

Surrounding the eccentric disc 12 and the bearing 15 is a casing 17 provided with five cylinders 18 and pistons 19. The pistons 19, when forced inwardly by the admission of fluid under pressure to the outer ends of the cylinders 18 in a manner to be described, press against the outer race 16 of the bearing 15 through short connecting rods 20 provided with pressure pads which engage the outer race 16. The fluid is admitted to the cylinders 18 in succession and in a sector of their rotation such that the force exerted by the pistons 19 against the eccentric disc 12 applies a torque to the driving wheel 10.

Pressure fluid is admitted to the cylinders 18 as follows. For motion in the forward direction, fluid delivered under pressure from a hydraulic pump driven by the engine of the tractor is introduced through a connector 21 (FIGURE 2) to an annular passage 22 within the stub shaft 13. Mounted on the outer end of the fixed stud shaft so as to be axially slidable but non-rotatable thereon is a ported valve member 23 (FIGURE 3) having a flat seating face 24 which is pressed against a corresponding seating face 25 mounted to rotate with the casing 17. The casing 17 is provided with five passageways 26 each communicating at one end with an arcuate aperture in the seating face 25 and connected at the other end to a port 49 in a cut-off valve assembly 27 (FIGURES 2 and 4). There are five cut-off valve assemblies, one for each cylinder. Each cut-off valve assembly is also provided with a connector port 28 which communicates through a conduit (not shown) with the fluid inlet 29 (FIGURE 1) of the corresponding cylinder 18.

The ported valve member 23 is provided with an upper passage 30 which is in permanent communication with the annular passage 22, and a lower passage 31 which is in permanent communication with a tube 32 the outer end of which communicates with a connector 33. When the system is adjusted for forward motion of the tractor the connector 33 is connected to a fluid return line (not shown) which is maintained at a controllable base pressure. Since the ported valve member 23 is stationary and the casing 17 is rotatable, the passageways 26 come into communication successively with the upper passage 30 whereby when the cutoff valve 27 is in the position shown in FIGURE 4, fluid at pump delivery pressure is admitted successively to each of the cylinders 18 as it enters the sector in which the reaction of the piston pushing against the fixed eccentric disc 12 will exert a torque on the driving wheel 10 in the forward direction. On completion of the inward stroke of each piston, the corresponding passageway 26 comes into communication with the lower passage 31 of the ported valve member 23 whereby the fluid from the cylinder in which this piston operates will be discharged through the tube 32 and the connector 33 at the said base pressure.

For rotation in the reverse direction, the pumps and return connections to the connectors 21 and 33 respectively are reversed, so that pump delivery pressure is applied through the lower passage 31 and the upper passage 30 communicates with the return line at base pressure.

When the hydraulic pump is working, the ported valve member 23 is pressed against the seating face 25 by the pump delivery pressure acting in a chamber 34. Ball valves 35 and 36 communicating respectively with the upper and lower passages 30 and 31 ensure that the chamber 34 is maintained at pump delivery pressure in both forward and reverse operation. To ensure proper seating of the ported valve member 23 when starting up, i.e. before pump pressure is available, a compression spring 37 is provided.

When the cut-off valve assembly 27 is in the condition shown in FIGURE 4, that is to say with its movable member 38 in a left-hand end position, a through-passage 39 provides through communication between the ports 49 and 28. The valve can be held in this position, in circumstances to be described, by means of a detent pin 40 which enters a recess 41 in the movable member 38. The detent pin is urged upwardly by a spring 42, but would be forced downwardly against the spring 42 should the pressure in a chamber 43 exceed a predetermined value. The pressure in the chamber 43 is the said controllable base pressure and is applied thereto in the following manner.

Figure 4:
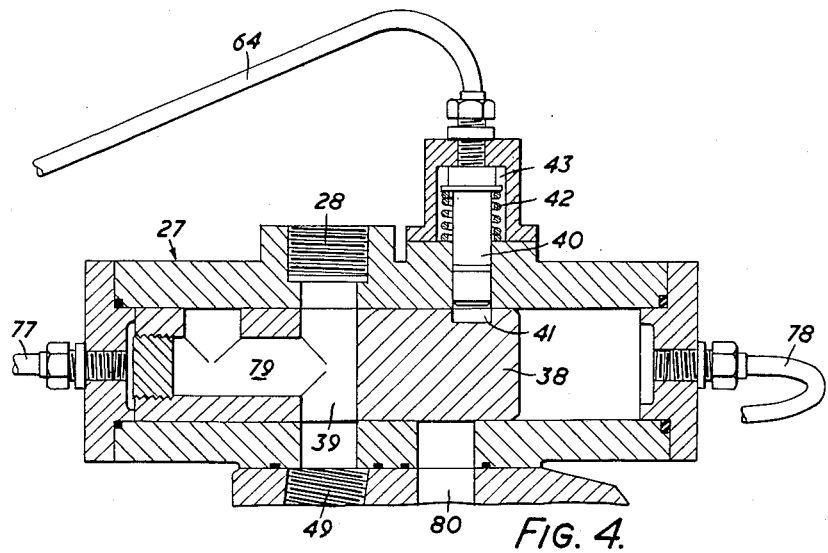
FIGURE 4 is a sectional view through the cut-off valve for one cylinder.
Figure 5:
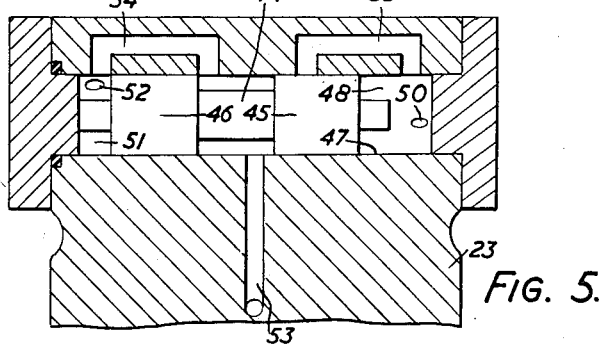
FIGURE 5 is a diagrammatic sectional view of the reversing shuttle valve.

In the ported valve member 23 there is a reversing shuttle valve 44 which is shown in FIGURES 3 and 5. This valve has two lands 45 and 46 and is movable in a cylindrical bore 47 in the ported valve member 23. A chamber 48 beyond the land 45 communicates through a passage 50 with the upper passage 30 while the opposite chamber 51 beyond the land 46 communicates through a passage 52 with the lower passage 31. Since for forward motion the upper passage 30 is at the pump delivery pressure and the lower passage 31 is at base pressure, the pressure in the chamber 48 will be higher than that in the chamber 51 and the reversing shuttle valve will occupy the end position shown in FIGURE 5. In reverse motion it will occupy its other end position. In the end position shown, the shuttle valve 44 provides communication between the chamber 51 and a passage 53 through a passage 54 which by-passes the land 46. Conversely, in reverse motion the passage 53 will be in communication with the chamber 48 through a passage 55 which by-passes the land 45 in the other end position of the valve but which, in the position shown, is blocked by the land 45. Consequently the pressure in the passage 53 is maintained continuously at the said base pressure, in both forward and reverse motion. The passage 53 communicates through a bore 56 in a fixed gear wheel 57 to be referred to in more detail hereafter with the inlet passages 58 of five rotary valves 59, only one of which is shown. The five inlet passages 58 and the five rotary valves 59 are disposed uniformly in a hub block 60 which is attached to the casing 17 through an intermediate member 61. Each rotary valve 59 is provided with an inlet groove 62 which is in permanent communication with the inlet passage 58, and the inlet groove 62 is in permanent communication through a passage 63 with a pipe 64 leading to the chamber 43 of the corresponding cut-off valve assembly 27. Consequently, as previously indicated, the pressure in the chamber 43 is at all times equal to the base pressure of the system both in forward and reverse motion.

Each rotary valve 59 is also provided with a drain groove 65 which is in permanent communication through a passage 66 with spaces 67 in the interior of the casing which are at drain pressure. This may be about atmospheric pressure, and in any case substantially below the said base pressure. Each rotary valve 59 also has two sets of internal passages 68 and 69 respectively. The internal passages 68 provide communication between the inlet groove 62 and two ports 70 and 71, the port 70 being in the same zone as a passage 72 in the valve block 60 and the port 71 being in the same zone as a passage 73. The ports 70 and 71 are on opposite sides of the rotary valve. The internal passages 69 communicate with the drain groove 65 and have ports 74 and 75 respectively, the port 74 being in axial alignment with the port 71 and the port 75 being in axial alignment with the port 70. Each rotary valve is provided with a large gear wheel 76, all five of these gear wheels meshing with the said fixed gear wheel 57. As indicated in FIGURE 3, the fixed gear wheel 57 is considerably wider than each gear wheel 76. Adjacent gear wheels 76 engage the fixed gear wheel 57 in different zones, whereby all five gear wheels 76 can be fitted in without mutual interference. Each gear wheel 76 is twice the diameter of the fixed gear wheel 57, so that during a single revolution of the driving wheel 10 each rotary valve 59 will be rotated through 180° in the hub block 60. Thus when the driving wheel 10 has rotated through one revolution from the position shown in FIGURE 3, the ports 70 and 71 would be in the positions at present occupied by the ports 75 and 74, i.e. they would be blocked, while the ports 75 and 74 would be in communication with the passages 72 and 73 respectively.

The passage 72 communicates through a pipe 77 with the left-hand end of the movable valve member 38 while the passage 73 communicates through a pipe 78 with the right hand end of the movable valve member 38. With the parts in the positions shown in the drawings, with the detent pin 40 raised, the movable valve member 38 would be forced to the right, since the pipe 77 is at the base pressure of the hydraulic system through the port 70, the passage 68 and the inlet groove 62, while the pipe 78 is at the drain pressure through the port 74, the passage 69 and the drain groove 65. On the next revolution, however, the pressures in the pipes 77 and 78 would be reversed so that the valve 38 would be forced back to the position shown in FIGURE 4.

When the valve member 38 is in its right-hand end position, the port 49 is blocked off and communication is established between the port 28 and the chamber 67 of the casing 17 through an auxiliary passage 79 in the movable valve member 38 and a return passage or vent 80, whereby the associated motor cylinder 18 is vented to the chamber 67.

The operation of the system described is as follows:

In low-speed, high load operation, whether forward or reverse, the base pressure is maintained high enough to force the detent pin 40 down into the recess 41 whereby the valve 38 is retained in its left-hand end position and consequently communication is maintained between all the passageways 26 and the corresponding cylinder inlets 29. Consequently all the cylinders are operative on each revolution and the maximum power output will be obtained.

For high-speed running at low loads the base pressure is reduced until the pressure in the chamber 43 is no longer strong enough to overcome the force of the spring 42. The detent pin 40 will therefore lift and permit the valve member 38 to oscillate under the action of the different pressures admitted through the pipes 77 and 78 respectively. As previously explained, on one revolution the pipe 77 will be at a higher pressure than the pipe 78 while the converse will apply on the next revolution. Consequently, each cylinder will be cut out on alternate revolutions. There will thus be only 2½ power strokes per revolution instead of five as in the previously described operating condition. The consumption of hydraulic fluid per revolution will therefore be halved.

Figure 6:
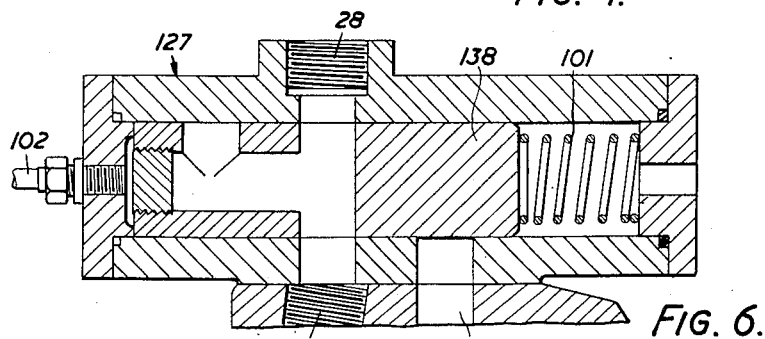
FIGURE 6 shows an alternative form of cut-off valve.

In the modification shown in FIGURE 6, the hub block 60, and all parts which it contains, are dispensed with, as are the pipes 64, 77 and 78. The cut-off valve assembly 127 is generally similar to the cut-off valve assembly 27 in FIGURE 4 except that the parts 40 to 43 are omitted and a spring 101 is provided which urges the movable valve member 138 towards its left-hand position as shown. The left-hand end of the valve assembly communicates through a pipe 102 with the cylinder immediately preceding the cylinder associated with this valve assembly. Thus, when the previous cylinder is pressurized during a working stroke, the pressure created therein forces the piston 138 to the right against the action of the spring 101, thereby putting the port 49 into direct communication with the drain passage 80 and preventing the application of pressure to the cylinder in question. Since this cylinder is not put under pressure on this revolution, the cut-off valve assembly of the succeeding cylinder will not be actuated and will remain in the left-hand position, whereby the succeeding cylinder will be pressurized.

In this embodiment any convenient means can be provided for putting the cut-off valve assemblies 127 out of action for low-speed, high-load operation, for example, shut-off valves may be provided in the pipes 102. Alternatively pressure-actuated detent means corresponding to the parts 40 to 43 in FIGURE 4 may be provided. It is also necessary, for reverse operation, to provide means for changing the connection of each pipe 102 from what was, in forward motion, the immediately preceding cylinder to the immediately succeeding one.

What we claim as our invention and desire to secure by Letters Patent is:

1. Control means for a multi-cylinder hydraulic motor having at least five cylinders and motive fluid conduit means connected to each of said cylinders, said control means comprising distributor valve means to distribute motive fluid sequentially to said motive fluid conduit means, a cut-off valve in each said motive fluid conduit means between said distributor valve means and the cylinder to which said conduit means is connected, each said cut-off valve having an inoperative position in which said conduit means is open and an operative position in which said conduit means is blocked, and means actuated in dependence on the rotational position of said cylinder block for moving each of said cut-off valves between said inoperative position and said operative position.

2. Control means according to claim 1 in which each of said means for moving said cut-off valves includes a rotatable member mounted for rotation with said cylinder block about said fixed eccentric and also for rotation relative to said cylinder block, a two to one reduction gear drive for said rotatable member to rotate same by half a revolution relative to said cylinder block on each revolution of said cylinder block about said fixed eccentric, and a connection between said rotatable member and said cut-off valve associated therewith operative to put said cut-off valve in said operative position once in each revolution of said rotatable member, whereby each of said cut-off valves occupies its operative position only on alternate revolutions of said cylinder block.

3. Control means according to claim 2 in which each cut-off valve is equipped with means for retaining same in said inoperative position irrespective of the position of said rotatable member.

4. Control means for a multi-cylinder hydraulic motor having at least five cylinders and motive fluid conduit means connected to each of said cylinders, said control means comprising distributor valve means to distribute motive fluid sequentially to said motive fluid conduit means, a cut-off valve in each said motive fluid conduit means between said distributor valve means and the cylinder to which said conduit means is connected, each said cut-off valve having an inoperative position in which said conduit means is open and an operative position in which said conduit means is blocked, and means actuated by the motive fluid pressure in the preceding cylinder for moving each of said cut-off valves between said inoperative position and said operative position.

5. Control means according to claim 4 including means biasing each of said cut-off valves towards said inoperative position, hydraulic piston and cylinder means acting on said cut-off valves in opposition to said biasing means, and conduit means connecting each of said hydraulic piston and cylinder means to the immediately preceding working cylinder, the effective area of said hydraulic piston and cylinder means and the strength of said biasing means being so selected that application of the working pressure of the motive fluid to said hydraulic piston and cylinder means overcomes said biasing means and moves said cut-off valve into said operative position.

6. Control means according to claim 5 in which each cut-off valve is equipped with means for retaining same in said inoperative position irrespective of the pressure in said preceding working cylinder.

7. A cut-off valve for a working cylinder of a hydraulic motor comprising a valve body having a bore therein, motive fluid inlet port means in said body adapted for connection to a supply of motive fluid, motive fluid outlet port means in said body adapted for connection to said working cylinder, motive fluid drain port means in said body, a valve member having two end faces and slidable axially in said bore, said valve member having an operative end position in which it blocks said motive fluid inlet port means and an inoperative position, passage means in said valve member which when said valve member is in said operative end position connect said motive fluid outlet port means to said drain port means and when said valve member is in said inoperative end position connect said motive fluid inlet port means to said motive fluid outlet port means and end walls of said valve body each defining a pressure chamber with one of said end faces of said valve member and part of said bore, separate pressure fluid connections to said pressure chambers, detent means to retain said movable valve member in said inoperative position, said detent means comprising wall means defining a detent-actuating pressure chamber, a detent pin extending through said valve body into said chamber, spring means urging said detent pin outwardly of said body, and a pressure connection to said chamber whereby pressure can be applied to said chamber to force said detent pin inwardly into said bore against the action of said spring.

References Cited in the file of this patent
UNITED STATES PATENTS

| | | |
|---|---|---|
| 373,259 | Whittier | Nov. 15, 1887 |
| 688,598 | Coryell | Dec. 10, 1901 |
| 1,462,874 | Slater | July 24, 1923 |
| 1,507,442 | Spears | Sept. 2, 1924 |
| 1,989,212 | Pascolini | Jan. 29, 1935 |
| 2,273,900 | Sklenar | Feb. 24, 1942 |
| 2,457,100 | Horton | Dec. 21, 1948 |
| 2,871,830 | Wirth et al. | Feb. 3, 1959 |